United States Patent [19]

Vandervoort

[11] 4,104,928
[45] Aug. 8, 1978

[54] TRANSMISSION

[75] Inventor: John R. Vandervoort, Richland, Mich.

[73] Assignee: Eaton Corporation, Cleveland, Ohio

[21] Appl. No.: 724,895

[22] Filed: Sep. 20, 1976

[51] Int. Cl.² .................... F16H 3/08; F16H 57/00; F16D 11/00
[52] U.S. Cl. ........................ 74/331; 74/359; 74/410
[58] Field of Search ............ 74/331, 410, 325, 359, 74/360

[56] References Cited

U.S. PATENT DOCUMENTS

| | | | |
|---|---|---|---|
| 2,995,046 | 8/1961 | Mansachs | 74/410 |
| 3,105,395 | 10/1963 | Perkins | 74/410 X |
| 3,283,613 | 11/1966 | Perkins | 74/410 |
| 3,335,616 | 8/1967 | Perkins | 74/331 |
| 3,500,695 | 3/1970 | Keiser | 74/410 X |
| 3,555,920 | 1/1971 | Merritt | 74/331 X |
| 3,611,823 | 10/1971 | Richards et al. | 74/410 X |
| 3,910,131 | 10/1975 | Richards | 74/331 |

*Primary Examiner*—Samuel Scott
*Assistant Examiner*—Carl F. Pietruszka
*Attorney, Agent, or Firm*—R. J. McCloskey

[57] ABSTRACT

An improved change gear system having a plurality of spaced countershafts having parallel axes and means supporting the countershafts in a casing for rotation. Countershaft gears are provided on the countershafts and are concentric and rotatable therewith. A rotatable main shaft is provided which is arranged substantially parallel with the countershafts and is preferably located between a pair of the countershafts. Means are provided for pivotally supporting one end of the main shaft in addition to means for guiding the other end thereof in a free floating relation relative to the one end for movement in at least a direction transverse of a plane through the axes of two of the countershafts. A plurality of axially constrained thrust rings are fixed to the main shaft for rotation therewith and cooperate with a fixed thrust plate for transferring thrust loads on the main shaft to the casing. Clutching means are provided for effecting a driving connection between the countershafts and the main shaft.

8 Claims, 2 Drawing Figures

TRANSMISSION

FIELD OF THE INVENTION

This invention relates to a multicountershaft transmission having provision for the equalizing of torque transmission through the countershafts and, more particularly, to the type thereof having means to relieve the thrust loads on the main shaft.

BACKGROUND OF THE INVENTION

In U.S. Pat. No. 3,105,395, issued Oct. 1, 1963, assigned to the same assignee as the present invention, there has been set forth a highly effective and commercially successful system for obtaining the recognized advantages of a multicountershaft transmission while maintaining in a very simple manner the equality of torque transmission through the said countershafts. The transmission set forth in this patent provides both an input shaft and the countershafts on fixed axes with the gears thereof being immovable radially with respect to the respective shafts on which they are mounted. The output shaft, however, or main shaft, is floatingly mounted for movement transverse to a plane through the axes of two countershafts and the main shaft gears when the main shaft gears are unclutched from the main shaft. The main shaft gears, which are supported on and by the countershaft gears, encircle the main shaft with sufficient clearance to permit movement of the main shaft radially with respect to the gears. Thus, the main shaft can move radially with respect to the gears to which it is not clutched but the gear to which said main shaft is clutched and said main shaft are radially movable as a single unit transversely with respect to the plane connecting the axes of the two countershafts in order to equalize the torque received onto the main shaft from each of such countershafts. The movement accurately follow irregularities in the gears and their mounting means whereby the system works well and has received wide commercial acceptance.

In U.S. Pat. No. 3,237,472, issued Mar. 1, 1966, also assigned to the same assignee as the present application, there is disclosed the utilization of a floating main shaft having improved shaft mounting means together with an output shaft on a fixed axis. This patent was for certain purposes an improvement over the earlier U.S. Pat. No. 3,105,395 but was not fully satisfactory in that the specific means shown in the earlier patent for supporting the main shaft and/or connecting same to power transmitting means are relatively expensive to manufacture, somewhat awkward in assembly and utilized an appreciable amount of longitudinal space.

In U.S. Pat. No. 3,335,616, issued Aug. 15, 1967, also assigned to the same assignee as the present application, there is disclosed the utilization of a fixed main shaft rotatably supported at both ends by bearings. Furthermore, the transmission set forth in this patent provides also for an input shaft and the countershafts being supported on fixed axes with the gears thereof being immovable radially with respect to the respective shafts on which they are mounted. The main shaft gears are also here supported on and by the countershaft gears and, when unclutched from the main shaft, said main shaft gears encircle the main shaft with sufficient clearance to permit movement of the gears radially with respect to the main shaft. Thus, the unclutched main shaft gears can move radially with respect to the main shaft but the gear to which the main shaft is clutched is rotatable as a single unit therewith. In this embodiment, however, the means for clutching the gear to the main shaft is floatingly mounted for movement transverse to the main shaft in a plane connecting the axes of two countershafts so that the gear clutched to the main shaft by the floating clutch means will continue to be floatingly oriented with respect to the main shaft in order to equalize the torque received onto the main shaft from each of such countershafts. This system also works well and has received good commercial acceptance.

It is to be noted that in the three above-mentioned patents, the main shaft is supported in a centered position between two countershafts. In U.S. Pat. Nos. 3,105,395 and 3,237,472, both ends of the main shaft are permitted to float in directions transverse to the plane passing through the axes of two countershafts. The specific means shown in these patents for supporting the main shaft are effective but are relatively expensive to manufacture.

The device shown in U.S. Pat. No. 3,335,616, which utilizes a main shaft supported for rotation about a fixed axis, is also effective but relatively expensive to manufacture due to the provision of floating clutch means on the main shaft. Particularly, the floating clutch means are expensive to manufacture because they must maintain a tolerance which will permit them to float on the main shaft while at the same time which will not result in a sloppy coupling between the main shaft gear and the main shaft.

In U.S. Pat. No. 3,500,695, issued Mar. 17, 1970, also assigned to the same assignee as the present application, there is disclosed the utilization of a mainshaft having one end floating and the other end pivoted. The transmission illustrated in this patent was for certain purposes an improvement over the transmissions illustrated in earlier patents, but was not fully satisfactory as the main shaft was, in certain conditions, subject to axial thrust loads tending to cause undesirable axial shifting of the main shaft and unequal and/or excessive wear on certain transmission components such as the clutch teeth or the like.

SUMMARY OF THE INVENTION

In an effort to effect further improvements in a transmission of this general type, efforts have been made to provide means diminishing each of the foregoing-named disadvantages and the following described invention is the result.

Accordingly, the objects of this invention include:

(1) To provide a heavy-duty transmission gearing system which utilizes at least two countershafts wherein the power is divided equally therebetween.

(2) To provide a heavy-duty transmission, as aforesaid, which is capable of automatically and continuously dividing the power equally between at least two countershafts whereby to compensate for manufacturing irregularities in the apparatus.

(3) To provide a heavy-duty transmission system, as aforesaid, wherein the two countershafts and gears associated therewith will be identical with each other (other than in some instances in the position of a keyway or other locating devices for the countershaft gears on the countershaft) and thereby effect a system of maximum simplicity in both manufacture, inventorying of parts, and in assembly.

(4) To provide a heavy-duty transmission system, as aforesaid, which can be embodied in transmission parts which are strong and sturdy, which are free from parts requiring delicate adjustment, whose parts will be easily accessible for inspection and/or repair when needed, all toward the end of providing a long period of satisfactory and effective operation at relatively low cost.

(5) To provide mounting means, as aforesaid, for pivotally supporting a shaft to permit one end to move radially in any direction while rotating but at the same time restricting the other end to just rotational movement.

(6) To provide mounting means for a rotatable shaft, as aforesaid, which will be less expensive to manufacture and assemble than the various mounting means and/or gear arrangements for the main shaft shown in U.S. Pat. No. 3,105,395; 3,237,472 and 3,335,616, above mentioned.

(7) To provide a mounting means for the main shaft which will not be subject to axial thrust load tending to cause excessive wear of the clutch teeth or the like as might otherwise occur in certain conditions with the mounting means shown in U.S. Pat. No. 3,500,695.

Other objects and purposes of the invention will be apparent to persons acquainted with apparatus of this general type upon reading the following disclosure and upon inspection of the accompanying drawings.

DESCRIPTION OF THE PREFERRED EMBODIMENT

Figure 1:
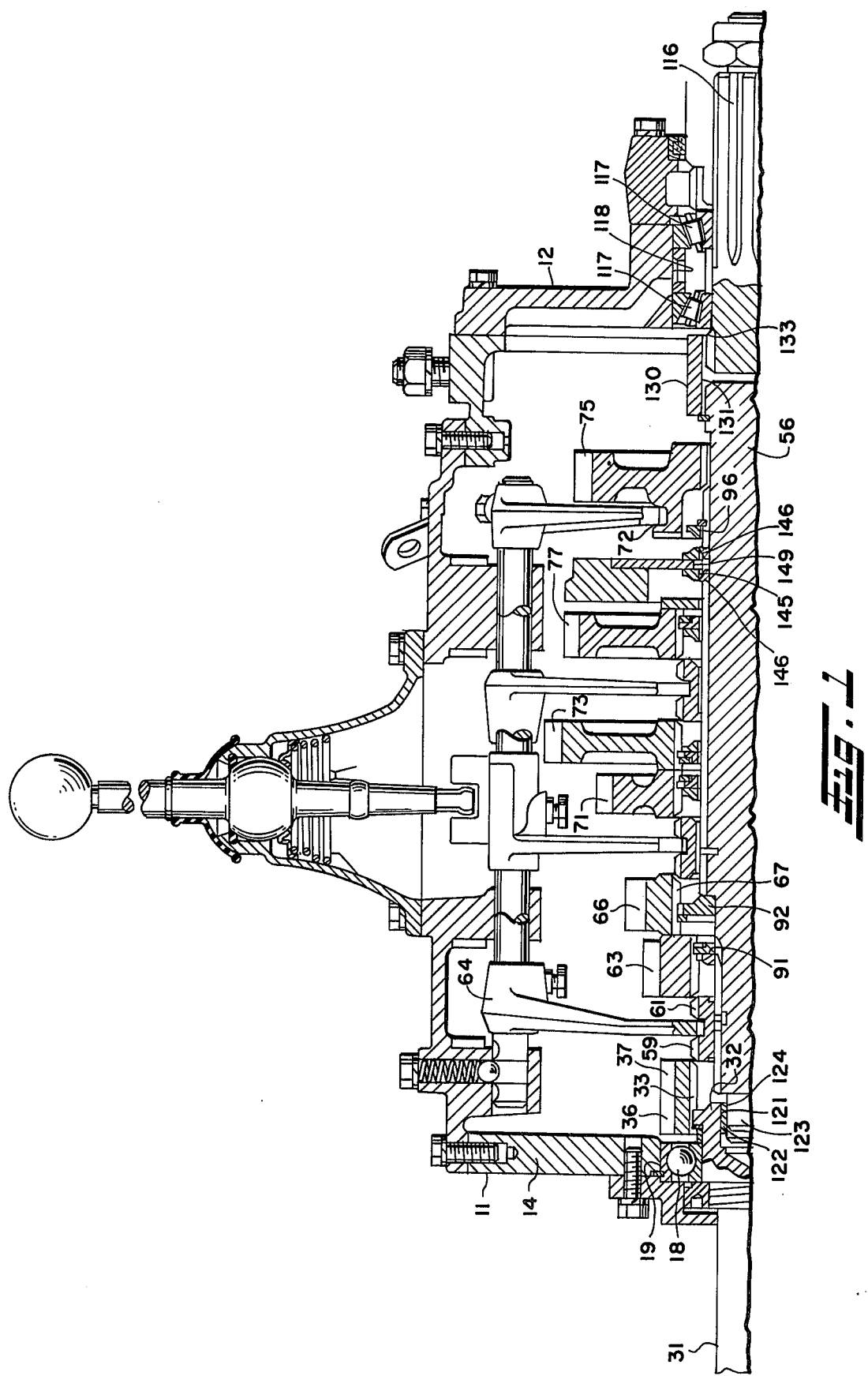
FIG. 1 is substantially the upper half of a front view in section of a multiple countershaft transmission embodying the present invention. Certain elements, such as the reverse idler gear and shaft, have been shown slightly out of position for illustrative purposes only.
Figure 2:
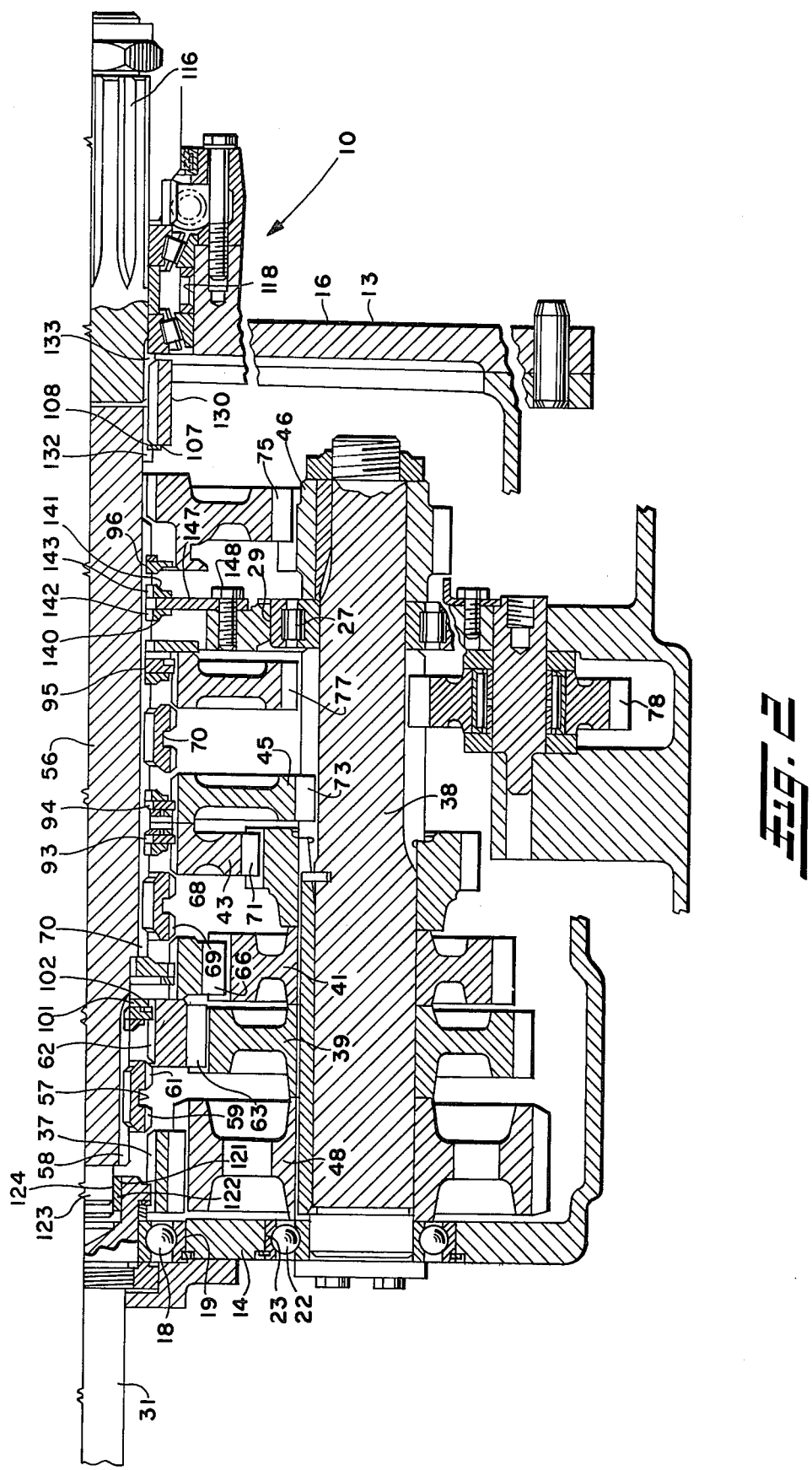
FIG. 2 is the lower half of the sectional front view of FIG. 1.

In this disclosure, certain terminology will be used for convenience in reference only and will not be limiting. For example, the terms "forward" and "rearward" will refer to directions forward and rearward of the vehicle in which the transmission is installed. Thus, the leftward portion of the transmission as appearing in the Figure is forward and the rightward portion as appearing in said figure is rearward. The terms "rightward" and "leftward" will refer to directions as taken in the drawing in connection with which said terminology is used. The terms "inward" and "outward" will refer to directions toward and away from, respectively, the geometric center of the apparatus. All terms mentioned foregoing include all normal derivatives and equivalents of each thereof.

For convenience of identification, the shaft 31 has throughout been called the input shaft, and the shaft 56 has been called the main shaft and the shaft 116 has been called the output shaft. This terminology has, however, been used for convenience in reference and it is to be given no limiting significance, inasmuch as the apparatus will operate equally well with the direction of power flow reversed.

This invention is an improvement on the type of multiple countershaft transmission having a main shaft with one end guided for free floating relative to the transmission casing and the other end pivotably supported such as is described in detail in U.S. Pat. No. 3,500,695 issued Mar. 17, 1970, and hereby incorporated by reference.

Referring now to the drawing, there is provided a multicountershaft transmission 10 having a casing 11 which may be horizontally split into upper and lower portions 12 and 13, respectively. The lower portion 13 has a forward end wall 14 and a rearward end wall 16. A suitable, depending, oil sump (not shown) may be provided, if desired.

Each of said end walls is provided with openings for the reception of the various shaft bearings. The input shaft bearing 18 is supported in a suitable opening 19 in the wall 14. The countershaft bearing 22 is supported in suitable opening 23, in the forward end wall 14. Countershaft bearing 27 is supported in opening 29 in the rearward end wall 16. In the Figure, only one countershaft is shown; however, it is understood that at least one other substantially identical countershaft is provided as is well known in the art.

An input shaft 31 is supported in the bearing 18 and has an enlarged head 32 formed on the rearward end thereof. The head 32 carries splines 33 and carries thereon the annular drive gear 34. The drive gear 34 has external teeth 36 and internal clutch teeth 37.

Countershaft 38 is supported by the bearings 22 and 27 and carries thereon and fixed for rotation therewith the countershaft ratio gears 39, 41, 43, 45, and 46. It is noted countershaft ratio gear 46 is mounted rearward of bearing 27 in a cantilevered manner.

A second countershaft (not shown) is supported within suitable bearings and is in all respects preferably identical with the first countershaft 38. Corresponding second countershaft ratio gears are mounted on and for rotation with the second countershaft and are preferably identical with the ratio gears 39, 41, 43, 45, and 46, respectively. The countershaft gear 48 is in constant mesh with the input gear 34.

The main shaft 56 is in this embodiment, and preferably, arranged substantially coaxial with the input shaft 31 and is pivotally supported at the rearward end as hereinafter described in further detail. Gears are provided encircling the main shaft for constant engagement with and support by the countershaft gears and said countershaft gears and/or said main shaft gears are appropriately clutched to each other or to their respective shafts, in any convenient manner to provide driving connections from the two countershafts through a selective pair of said countershaft gears to and through the main shaft gears associated therewith to the main shaft. The particular method of clutching hereinafter described will thus be recognized as illustrative only and not limiting.

In this particular embodiment, the main shaft clutch unit 57 is slidingly mounted on the forward end of the main shaft 56 on splines 58 and carries clutch teeth 59 which are engageable with the clutch teeth 37 on the input gear 34 upon leftward movement of said clutch unit 57. Clutch unit 57 also carries clutch teeth 61 which engage suitable internal clutch teeth 62 in a gear 63 upon rightward movement of the clutch unit 57. The gear 63 is meshed with and carried by the countershaft gear 39 and the identical counterpart thereof on the other countershaft. Said clutch unit 57 is provided with any suitable means for effecting axial movement thereof, such as by the usual grooves and a shift fork 64.

The main shaft gear 66 is supported between and by the countershaft gear 41 and its identical counterpart on the other countershaft and has a set of internal clutch teeth 67. Clutch unit 68 is slidingly mounted on the splines 70 of the main shaft and is externally toothed at 69 to engage the teeth 67 upon leftward movement of the clutch unit 68 for clutching said gear 66 to the main shaft 56.

The main shaft gears 71, 73 and 75 are supported in a similar manner by the countershaft gears and are selectively drivingly engageable with the main shaft by clutch units 68, 70 or 72 as is well known in the art.

Main shaft gear 77 is engaged by a reverse idler 78 (shown schematically out of position in the Figure) as is also well known in the art.

Axial movement of the several main shaft gears relative to the main shaft may be prevented by any convenient and conventional device such as the devices 91, 92, 93, 94, 95 and 96 as is well known in the art. Normal tolerances will permit the devices, which may be one-piece or multipiece assemblies, and the mainshaft gears to move axially a little but not enough to interfere with the successful operation of the apparatus. It will be noted that the external diameters of the devices are sufficiently less than the internal diameters of the grooves in the gears, such as groove 97 in gear 63, that a substantial clearance is provided therebetween in order that the presence of the devices will not in any way interfere with movement of the main shaft gears in any radial direction with respect to the main shaft 56. Thus, it should again be emphasized that the mainshaft gears are in no degree or sense supported on or by the shaft 56 and the devices function only to prevent axial motion of said devices or said gears with respect to the main shaft 56.

The devices 91, 92, 93, 94, 95 and 96 all have similar known structure for preventing axial movement of the main shaft gears relative to the main shaft 56 and no further detailing is deemed necessary.

Each of said gears 63, 66, 71, 73, 77 and 75 may be collectively termed "main shaft gears", since they are all capable of drivingly engaging the main shaft. However, it is emphasized that they are all supported on and by the countershaft gears and they merely surround and at times engage the main shaft but are not supported on or by the main shaft. Rather, as will be further developed, the main shaft will move both rotatively and about a pivot axis described in more detail hereinbelow with respect to those of the main shaft gears with which it is not clutched at a particular moment.

Since each of the main shaft gears is constantly engaged with the countershaft gears with which it is supported, engagement or disengagement of a given main shaft gear with the main shaft will not affect its relationship with the countershaft gears upon and by which it is supported.

An output shaft 116 is rotatably mounted in bearings 117 which are in turn fixed in an opening 118 in the rear wall 16 of the transmission casing.

The output shaft 116 is connected to and driven by the main shaft 56 by means of a coupling 130. The coupling 130 comprises a sleeve having internal splines 131 therein which mate with the external splines 132 and 133 on the main shaft 56 and output shaft 116 respectively. A clearance 107 is provided between a snap ring 108 in a groove 109 in the mainshaft and the coupling. Thus the clearance 107 and the normal backlash between the splines 131 and 132 will permit the main shaft to pivot about a point located substantially on its axis at the rear end thereof.

It is to be recognized that the main shaft 56 could be pivotally supported by a bearing rather than the teeth construction, with the main shaft extending rearwardly as illustrated in the aforesaid U.S. Pat. No. 3,335,616. However, an appropriate output unit would be required in order to receive the power from the main shaft without disturbing the pivoted surface thereof.

The input shaft 31 is provided with a recess 121 housing a low friction bearing element 122 having a rearwardly facing opening 124 therein. The forward end of the main shaft 56 is provided with a frontwardly extending projection 123 which is received into the opening 124. The clearance 114 between the projection 123 and the low friction bearing 122 is substantially in excess of the normal machining tolerance for similar low friction bearings. For example, in a heavy-duty transmission the normal tolerance for machining the front end of a shaft to enable same to be received into a pilot is typically about 0.003; in the present case, it is typically from about 0.028 to 0.032, about 0.015 on each radius. Thus, the bearing 122 serves to both permit and provide the limit of radial movement of the forward end of the main shaft 56.

Since the forward end of the main shaft is guided for a free floating relation relative to the rearward end of the main shaft, the clearances around the splines on the output shaft 116, the main shaft 56 and the coupling 130, permit the main shaft 56 to pivot about the fixed point 111 between the ends of the main shaft preferably coincident with the axis of the main shaft.

Synchronizers or blocking rings can, if desired, be provided between the interengageable teeth associated with the main shaft 56. However, in the particular embodiment here illustrated, the ratios are as set forth for the main transmission in the previously mentioned patent and the use of synchronizers in the main gear set is accordingly unnecessary.

Located intermediate the ends of the main shaft, a pair of rotating thrust rings 140 and 141, are keyed to the main shaft 56 for rotation therewith. The rings each have internal splines, 142 and 143 respectively, which engage splines 145 on the main shaft. The rings are each keyed to main shaft 56 by a generally wedge shaped key 146 to prevent axial movement of the rings relative to the main shaft.

A thrust plate 147 is fixed to the transmission casing by conventional means, such as bolt 148 and includes a central opening 149 through which passes the main shaft. The thrust plate is received between the thrust rings with only a minimal clearance, in the range of 0.005 inch to 0.010 inch, to provide for an oil film.

The thrust rings, 140 and 141, will thus transfer axial thrust loads on the main shaft 56 to the thrust plate 147 and then to the casing 11 without interfering with the radial float of the main shaft. It has been discovered that the clutch members, 57, 68, 70 and 72, will be subject to substantially less wear if the axial thrust loads on the main shaft are transferred to the casing by the thrust rings and thrust plate than if the clutch members are subject to the axial thrust loads.

Turning now to the relationship between the pivoted main shaft of the transmission and the countershaft, it may be stated again that the transmission here shown follows the same general principles as set forth in U.S. Pat. Nos. 3,105,395 and 3,500,695 and that the improvement here in question deals with only the mounting of the main shaft. However, for convenience in reference and to insure a complete understanding of the present invention, the operation of the entire unit will be briefly reviewed.

In this connection, it will be emphasized first that the main shaft has no supporting relationship with the several main shaft gears but is only clutched to such thereof as is desired to be brought into the power train. However, the main shaft gear which in any given instance is clutched with the main shaft will engage same uniformly around the entire circumference of the main shaft and thereby hold it centered in and with respect to said gear. Therefore, since the normal clearance between the splines 131 and the splines 132 on the main shaft permit a limited but sufficient pivoted movement of the main shaft about the fixed point as described hereinabove, any main shaft gear which is clutched to the main shaft will carry the main shaft with it about the pivot point if and as the forward end thereof moves upwardly or downwardly between the countershaft gears with which said clutched main shaft gear is engaged.

The main shaft gears themselves will in their initial assembly be positioned between the countershaft gears associated therewith in such position that their axes are at least approximately in the common plane joining the axes of the countershafts gears. Then, as the given pair of countershaft gears rotate, the main shaft gear associated therewith will normally remain centered inasuch as its tendency to move off said center in one direction in response to one countershaft gear is counterbalanced by an equal tendency to move in the opposite direction in response to the opposite countershaft gear. In effect, as set forth in more detail in U.S. Pat. No. 3,105,395, a balanced couple is created by the equal and oppositely directed forces applied to the opposite sides of the main shaft gear. This will be effective inasmuch as both of said countershafts are rigidly locked to a single input shaft and said countershafts are, through said clutched main shaft gear, also rigidly locked to the single output shaft 116.

However, if one countershaft gear which, for example, may be taken as the countershaft gear 41, is irregular in shape, either within itself or as compared to the opposite countershaft gear, it may, if no compensating adjustment is made, tend to develop more pressure due to such irregularity on the associated main shaft gear 66 than is counterbalanced by the downwardly acting pressure from the corresponding countershaft gear. In such case, the load torque on the main shaft gear 66 will move said main shaft gear 66 in a direction opposite to the direction in which it is being driven and thereby restore the balance between the main shaft and the countershaft gears connected thereto.

It will be apparent from inspection of Figures and bearing in mind that gear 66 is permitted to move freely in a vertical direction about the pivot point, regardless of the pressure exerted on the gear 66, said load torque will effect a counterclockwise rotation of said gear 66 and thereby move the gear until the pressure equalizes.

In the foregoing discussion with respect to the operation of the embodiment chosen to illustrate the invention, reference has been made solely to the perpendicular movement of the countershaft gears with respect to a plane through the axes of the countershafts, and this is the movement which is effective in bringing about the proper division of power between the countershafts as above set forth. There will also of course be some sideward or axial movement of the main shaft, as pointed out in U.S. Pat. No. 3,105,395, but since the normal pressures of the countershaft gears against a main shaft gear in mesh therewith are to urge such main shaft gear respectively away from each of such countershaft gears, the main shaft gear will normally be balanced between the pair of countershaft gears with which it is associated and same will remain effectively located therebetween. However, should an imbalance occur, an axial thrust load will be created which will be transferred from the thrust rings to the thrust plate and then to the casing relieving the clutches from the potentially damaging effects of such thrust loads. Thus, the weight of the main shaft when any main shaft gear is clutched is carried by the main shaft gear to which it may be clutched and not by the bearing member 122. The function of said bearing member is only to hold said main shaft in an approximately centered position when all of the main shaft gears are unclutched therefrom in order that the clutches 57, 68, 70 and 72 will remain sufficiently centered with respect to the gear splines cooperating therewith that the next following clutching operation may be properly carried out. There is, however, a small restoring force tending to return the main shaft to a centered position. This restoring force is believed to be the result of the reaction torque in the connection between the splines 132 on main shaft 56 and the internal teeth 131 on the output shaft 116 tending to cause the shaft 56 to align itself with the output shaft 116. This force will also serve to hold the shaft 56 sufficiently centered with respect to the gear splines cooperating with the clutches.

Within the specified limits of the clearance above stated and with normal machining tolerances for gears, the clearance between the splines 131 and splines 132 will permit the forward end of the main shaft 56 to pivot or float as necessary for satisfactory operation. However, where the tolerances of the gears are such that more clearance is required to permit a greater floating of the forward end of the main shaft, the aforesaid clearance dimensions can be increased beyond the aforesaid limits.

Although particular preferred embodiments of the invention have been disclosed above for illustrative purposes, it will be understood that variations or modifications thereof are possible within the spirit and the scope of the invention as hereinafter claimed.

The embodiments of the invention in which an exclusive property or privilege is claimed are defined as follows.

I claim:

1. An improved change gear system having a main shaft, a plurality of countershafts arranged on fixed axes parallel with and substantially symmetrical about said main shaft, a gear encircling and clutchable to the main shaft which gear is adapted for simultaneous meshing with, and support by, gears positioned respectively on each of said countershafts whereby a driving relationship may be established between said countershafts and said main shaft, first means located adjacent one end of said main shaft for pivotally supporting same and second means for guiding the other end of said main shaft in a free floating relation relative to said one end and for movement at least in a direction transverse of a plane through the axes of two of said countershafts, the improvement comprising: third means intermediate the ends of said main shaft for restricting axial movement thereof without restricting radial movement thereof, said third means comprising a pair of closely spaced rings axially and rotationally fixed to the main shaft and a thrust plate fixed directly to the housing, said plate having an opening therethrough for receipt of said main shaft, said thrust plate closely received inbetween said rings.

2. The improved change gear system of claim 1 wherein said shaft has a plurality of external splines which mate with a plurality of internal splines on said rings.

3. The improved gear change system of claim 2 wherein said rings are keyed to said shaft.

4. The improved change gear system according to claim 1, wherein said pivot point is located adjacent said one end of said main shaft.

5. A change gear system according to claim 4 wherein said one end is the rearward end of said change gear system.

6. A change gear system according to claim 1 wherein said means guiding the other end of said main shaft includes a low friction bearing element; and
   wherein normal machining clearance plus extra clearance is provided between said low friction bearing element and said other end of said shaft to permit a free floating relation of said other end relative to said one end in a direction transverse of said plane through the axes of two of said countershafts.

7. An improved change gear system having:
   a casing;
   a plurality of spaced countershafts having parallel axes and means supporting said countershafts for rotation in said casing;
   countershaft gears concentrically supported upon said countershafts;
   a rotatable main shaft arranged substantially parallel with said countershafts and located between a pair of said countershafts, means pivotally supporting one end of said main shaft in said casing and means guiding the other end of said main shaft in a free floating relation relative to said one end and for movement at least in a direction transverse of a plane through the axes of two of said countershafts;
   a rotatable gear encircling said pivoted shaft and being free to float radially with respect to said pivoted shaft, said rotatable gear being simultaneously meshed with countershaft gears on each of said countershafts and being supported thereby for rotational movement with respect to said pivoted shaft; and
   clutching means for affecting a driving connection between said countershafts and said pivoted shaft through said countershaft and said rotatable gear,
   said improvement comprising:
   means for transferring axial thrust forces from said main shaft to said casing without restricting the radial movement of said main shaft, said means for transferring axial thrust forces comprising a pair of closely axially spaced rings rotationally and axially fixed to said main shaft and a thrust plate fixed to said casing and received between said rings, said plate having an aperture therethrough through which said main shaft extends, said aperture of larger diameter than the outer diameter of the mainshaft but of smaller diameter than the outer diameter of the rings.

8. The improved gear change system of claim 7 wherein the combined axial clearance between said plate and said rings is in the range of 0.005 inch to 0.015 inch.